US008859085B2

(12) United States Patent
Hahn et al.

(10) Patent No.: US 8,859,085 B2
(45) Date of Patent: Oct. 14, 2014

(54) NON-VINYL RESILIENT FLOORING PRODUCT AND METHODS OF MAKING SAME

(75) Inventors: Kris Edward Hahn, Big Canoe, GA (US); Jeffrey Wright, Cartersville, GA (US); Kellie Ballew, Canton, GA (US)

(73) Assignee: Columbia Insurance Company, Omaha, NE (US)

( * ) Notice: Subject to any disclaimer, the term of this patent is extended or adjusted under 35 U.S.C. 154(b) by 558 days.

(21) Appl. No.: 13/099,039

(22) Filed: May 2, 2011

(65) Prior Publication Data

US 2011/0268933 A1   Nov. 3, 2011

Related U.S. Application Data

(60) Provisional application No. 61/330,006, filed on Apr. 30, 2010.

(51) Int. Cl.
| | | |
|---|---|---|
| *B32B 3/00* | (2006.01) | |
| *E04F 15/02* | (2006.01) | |
| *B32B 5/26* | (2006.01) | |
| *B32B 25/08* | (2006.01) | |
| *B32B 27/08* | (2006.01) | |
| *B32B 27/12* | (2006.01) | |
| *B32B 27/32* | (2006.01) | |
| *E04F 15/16* | (2006.01) | |

(52) U.S. Cl.
CPC . *E04F 15/02* (2013.01); *B32B 5/26* (2013.01); *B32B 25/08* (2013.01); *B32B 27/08* (2013.01); *B32B 27/12* (2013.01); *B32B 27/32* (2013.01); *E04F 15/16* (2013.01); *B32B 2255/10* (2013.01); *B32B 2255/26* (2013.01); *B32B 2262/101* (2013.01); *B32B 2274/00* (2013.01); *B32B 2307/4023* (2013.01); *B32B 2307/554* (2013.01); *B32B 2471/00* (2013.01); *E04F 15/163* (2013.01)

USPC ........ 428/204; 428/195.1; 428/201; 428/203; 428/207

(58) Field of Classification Search
USPC ...................... 428/195.1, 201, 203, 204, 207
See application file for complete search history.

(56) References Cited

U.S. PATENT DOCUMENTS

| 7,175,904 B2 * | 2/2007 | Oshilaja et al. ............... 428/323 |
| 2004/0062903 A1 * | 4/2004 | Evans et al. ..................... 428/95 |
| 2010/0297394 A1 * | 11/2010 | Peace ............................ 428/145 |

FOREIGN PATENT DOCUMENTS

| DE | 102005023661 A1 | 11/2006 |
| EP | 2080629 A2 | 7/2009 |
| WO | WO-2008/029105 | * 3/2008 |

OTHER PUBLICATIONS

Belgian Search Report for Belgian Application No. 2011/00262.

* cited by examiner

*Primary Examiner* — Bruce H Hess
*Assistant Examiner* — Christopher Polley
(74) *Attorney, Agent, or Firm* — Ballard Spahr LLP (57) ABSTRACT

Described herein is a resilient floor covering made from non-vinyl materials. Also disclosed are related methods for manufacturing the resilient floor coverings described herein.

24 Claims, 3 Drawing Sheets

NON-VINYL RESILIENT FLOORING PRODUCT AND METHODS OF MAKING SAME

CROSS-REFERENCE TO RELATED APPLICATIONS

This application claims priority to U.S. Provisional Patent Application Ser. No. 61/330,006 filed Apr. 30, 2010, which is hereby incorporated by reference in its entirety for all purposes.

FIELD OF THE INVENTION

This invention relates to a resilient floor covering, and more particularly, to a non-vinyl resilient flooring product.

BACKGROUND OF THE INVENTION

Conventional resilient floor coverings are typically produced in the form of a continuous sheet or in the form of a tile. Resilient sheet flooring typically comprises a bottom, thermally stable base or matte layer coated with one or more layers of similarly formulated polymeric compounds. For aesthetic purposes, an ink layer is also typically disposed between the polymeric layers and the polymeric layers may optionally be chemically or mechanically embossed. Similarly, resilient tile flooring is typically formed as a composite laminated structure having a base layer, a decorative layer applied on top of the base layer, a protective film layer disposed on top of the decorative layer, and a top coat disposed on top of the protective film layer. For aesthetic purposes, the tile may also be mechanically embossed to impart a desired surface texture or pattern.

Currently, conventional resilient sheet and tile floorings both utilize vinyl polymers, such as polyvinyl chloride plastisols, polyvinylchloride homopolymers, and polyvinylchloride acetate resin, as a primary component in the various base and composite layers described above. However, these conventional vinyl flooring systems have several known drawbacks. For example, the long term appearance of an installed resilient floor is dependent on its dimensional stability which refers to the ability of the tile or sheet to retain its original dimension and resist shrinkage over the usable service life of the flooring. To that end, conventional vinyl polymers are incapable of providing the necessary dimensional stability needed to preserve an acceptable long term appearance and service life of an installed resilient floor. In an effort to improve dimensional stability, various chemical stabilizers and fiber based additives including synthetic fibers, fillers, binders, resin, and glass have been incorporated into these polymer systems. Unfortunately however, these additives and stabilizers also result in an increased cost of the end product. Additionally, vinyl polymers are also known to have limited flexural and impact resistance properties as the concentration of additives, such as fillers and fibers, is increased. This is particularly problematic as increasing filler concentration not only increases dimensional stability but is also a recognized means for enhancing fire suppression, thermal insulation, and sound dampening properties of the floor covering as well.

Still further, the installation of resilient flooring typically requires the use of an adhesive material for securing the floor covering to the underlying subfloor structure. Many conventional commercially available adhesive materials are chemically incompatible with vinyl polymers and will in some instances not provide the necessary adhesion. In even more extreme cases, certain adhesives will chemically react with the vinyl polymers resulting in a complete degradation of the resilient flooring. Thus, it has become necessary to provide specially formulated adhesive materials that are chemically compatible with conventional vinyl resilient floor coverings. Understandably, this too creates added installation expenses that would be desirable to avoid.

Resilient flooring also has a limited lifespan and must eventually be replaced, with the resultant used flooring generally being sent to landfill. The vast quantities of flooring waste that are generated annually are burdensome to landfill capacity and have a negative impact on the environment. To reduce the impact of used resilient flooring on the environment, and to reclaim some of the financial loss due to discarding of useful material waste, resilient flooring recycling would appear to be a logical solution. However, the presence of vinyl polymers in resilient floorings creates added complexity for recycling efforts. In particular, vinyl polymers must first be mechanically separated from the myriad of dissimilar polymeric and inorganic materials that are commonly present in resilient flooring. Additionally, the cost of regrinding and re-compounding these resins are generally prohibitive when compared to the significantly lower cost of virgin vinyl resins.

Lastly, and perhaps most importantly, there are significant public health and safety concerns associated with the use of vinyl polymer systems in resilient floor covering systems. As noted above, vinyl flooring products often contain additional chemicals to change the chemical or physical properties of the product. For example, phthalate plasticizers have traditionally been added to make PVC systems more flexible. There are concerns that these additives can leach out of the vinyl products over time. Additionally, there are concerns that vinyl flooring can over time release harmful chemical gases into the air. Some studies indicate that this outgassing may contribute to health complications. In view of these concerns, certain jurisdictions are now considering legislation that would ban the use of certain vinyl polymers, such as PVC, in various consumer goods due to the threats it poses to human and environmental health.

In view of these drawbacks, some in the flooring industry have begun seeking suitable replacements for conventional vinyl systems in the manufacture of resilient floor coverings. One alternative is the use of ordinary thermoplastic polyolefins.

Various methods are available for applying polyolefin backing materials, including powder coating, hot melt application and extruded film or sheet lamination. However, using ordinary polyolefins can also present difficulties. For example, ordinary polyolefin resins possess inadequate adhesion for use in resilient flooring construction. Additionally, ordinary polyolefins have relatively high application viscosities and relatively high thermal requirements. That is, ordinary thermoplastic polyolefins are characterized by relatively high melt viscosities and high recrystallization or solidification temperatures. Even ordinary elastomeric polyolefins, i.e. polyolefins having low crystallinities, generally have relatively high viscosities and relatively high recrystallization temperatures.

One method for overcoming the viscosity and recrystallization deficiencies of ordinary polyolefins is to formulate the polyolefin resin as a hot melt which usually involves formulating low molecular weight polyolefins with waxes, tackifiers, various flow modifiers and/or other elastomeric materials. Unfortunately, hot melt systems can require considerable formulating and yet often yield inadequate delamination strengths. However, the most significant deficiency of typical hot melt system is their melt strengths which are generally too low to permit application by a direct extrusion coating technique. As such, polyolefin hot melt systems are typically applied by relatively slow, less efficient techniques such as by the use of heated doctor blades or rotating melt transfer rollers.

While unformulated high pressure low density polyethylene (LDPE) can be applied by a conventional extrusion coating technique, LDPE resins typically have poor flexibility which can result in excessive stiffness. Conversely, those ordinary polyolefins that have improved flexibility, such as ultra low density polyethylene (ULDPE) and ethylene/propylene interpolymers, still do not possess sufficient flexibility, have excessively low melt strengths and/or tend to draw resonate during extrusion coating. To overcome extrusion coating difficulties, ordinary polyolefins with sufficient flexibility can be applied by lamination techniques; however, lamination techniques are typically expensive and can result in extended production rates relative to direct extrusion coating techniques.

There remains a need for resilient floor coverings that do not contain vinyl polymers. In other words, it would be desirable to provide a non-vinyl resilient floor covering that can be manufactured in a manner and with equipment similar to that used to manufacture conventional vinyl resilient flooring. There similarly remains a need for a non-vinyl resilient flooring that provides dimensional stability and adequate flexural and impact resistance properties, irrespective of the concentration of inorganic filler that may be present. Still further, there is a need for non-vinyl resilient flooring capable of being recycled with greater ease than conventional vinyl flooring products. Lastly, there is also a need for a non-vinyl resilient flooring that is regarded as safe without any associated health and public safety concerns for the environment.

SUMMARY

Described herein are resilient floor coverings configured for placement on a floor in a selected orientation. In one aspect, the resilient floor coverings can have a backing portion, a decorative portion, and a wear layer. In another aspect, the backing portion can include more than one backing layer. In an additional aspect, the decorative portion can include an ink layer and/or a decorative layer. Optionally, the resilient floor coverings can have one or more tie layers positioned between the backing portion and the decorative portion and/or between the decorative portion and the wear layer.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a tube" can include two or more such tubes unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

In one embodiment, the invention relates to a resilient floor covering configured for placement on a floor in a selected orientation. In one aspect, and with reference to FIG. 1, the resilient floor covering can comprise a backing portion, a decorative portion, and a wear layer.

Figure 1:
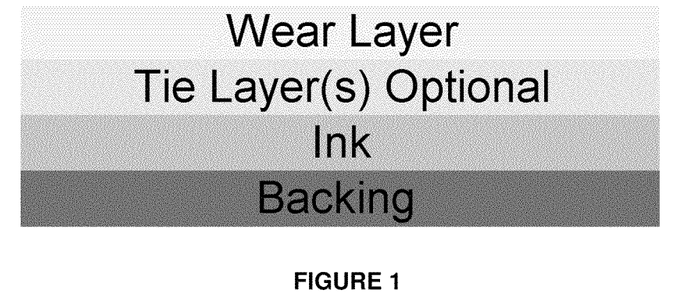
FIGS. 1-5 depict exemplary structures of the non-vinyl resilient flooring products described herein.

In one aspect, the backing portion of the resilient floor covering can have a bottom surface and an opposing top surface. In this aspect, the bottom surface of the backing portion can be configured to substantially abut the floor when the resilient floor covering is placed in the selected orientation. In another aspect, the backing portion can comprise at least one backing layer. It is contemplated that a backing layer of the at least one backing layer can define the bottom surface of the backing portion. It is further contemplated that a backing layer of the at least one backing layer can define the top surface of the backing portion. In one aspect, the at least one backing layer can comprise a single backing layer. Optionally, the at least one backing layer can comprise a plurality of backing layers.

In another aspect, the decorative portion of the resilient floor covering can have a bottom surface and an opposed top surface. In one aspect, the decorative portion can comprise an ink layer. In this aspect, the ink layer can define the top surface of the decorative portion. Optionally, the ink layer can also define the bottom surface of the decorative portion. In an additional aspect, the decorative portion can be configured to overlie the backing portion. In this aspect, the decorative portion can be substantially adjacent to the backing portion such that the top surface of the backing portion contacts the bottom surface of the decorative portion. It is contemplated that the ink layer can be applied either directly or indirectly thereto the top surface of the backing portion of the floor covering. Alternatively, the decorative portion can be spaced from the backing portion.

In another aspect, it is contemplated that the ink layer can comprise any conventional ink, dye, pigment, or other marking substance that can be applied within the resilient floor covering in a desired pattern. For example and without limitation, the ink layer can comprise water-based, soy-based, and/or solvent-based pigments that are selected to operatively adhere to the underlying decorative layer. In one particular example, the ink layer can comprise inks and pigments manufactured by Sun Chemical Corporation.

Further, it is contemplated that the ink layer may be applied to the underlying decorative layer by any conventional printing means to include, without limitation, rotogravure printing, flexography printing, lithography printing, offset-lithography printing, relief printing, thermography printing, thermal sublimation printing, dye-sublimation printing, heat-transfer printing, and the like.

In a further aspect, the wear layer can have an exposed, outer surface and an opposed, bottom surface. In this aspect, the outer surface of the wear layer can be configured for exposure to the ambient environment. In another aspect, the wear layer can be configured to substantially overlie the decorative portion of the floor covering. It is contemplated that the wear layer can be adjacent to the decorative portion such that the top surface of the decorative portion contacts the bottom surface of the wear layer. Alternatively, the wear layer can be spaced from the decorative portion. In one aspect, the wear layer can comprise, for example and without limitation, conventional ionomers, polyethylene terephthalate (PET), polyurethane, polypropylene, polytrimethylene terephthalate (PTT), Nylon 6, Nylon 6,6, and the like. It is contemplated that the wear layer can comprise surlyn resin, such as, for example and without limitation, Surlyn® 1706 resin, manufactured by E.I. du Pont de Nemours and Company, Inc. In a further aspect, the wear layer can be embossed with a desired texture pattern.

Optionally, the resilient floor covering can comprise at least one tie layer. In one aspect, the at least one tie layer can be positioned between opposing layers of the resilient floor covering to bond otherwise dissimilar materials that form the otherwise opposing layers of the floor covering together. As one skilled in the art will appreciate, such dissimilar materials can have inherent properties that negatively effect the ability of the respective materials to bond or otherwise adhere to each other.

In one aspect, one or more tie layers of the at least one tie layer can be positioned therebetween the bottom surface of the wear layer and the top surface of the decorative portion of the floor covering. In another aspect, a tie layer of the at least one tie layer can be positioned therebetween the bottom surface of the decorative portion and the top surface of the backing portion. In an additional aspect, each tie layer of the at least one tie layer can comprise, for example and without limitation, polyethyleneimine (PEI), conventional acrylic materials, maleic anhydride (MAH), ethylene-methyl acrylate (EMA), ethylene-vinyl acetate (EVA), and the like. It is contemplated that the at least one tie layer can comprise Entira™ modifiers and additives, such as, for example and without limitation, Entira™ Coat 100 modifier and additive manufactured by E.I. du Pont de Nemours and Company, Inc. It is further contemplated that the at least one tie layer can comprise water borne coating primers, including, for example and without limitation, G-680 Primer manufactured by Mica Corporation.

In another aspect, and with reference to FIGS. 2-5, the decorative portion of the floor covering can comprise a decorative layer. In this aspect, the decorative layer can have a desired aesthetic appearance, such as, for example and without limitation, the appearance of simulated hardwood or ceramic flooring. In one aspect, the decorative layer can define the bottom surface of the decorative portion of the floor covering. In an additional aspect, the ink layer can be configured to substantially overlie the decorative layer. In this aspect, the decorative layer can be adjacent to the ink layer. In a further aspect, the decorative layer can comprise a film. In still a further aspect, the decorative layer can comprise, for example and without limitation, oriented polypropylene (OPP), polypropylene (PP) film, polyethylene (PE) film, PET film, oriented PET film, PTT film, nylon film woven polyethylene (PE), nonwoven PE, woven polypropylene (PP), nonwoven PP, woven PET, nonwoven PET, woven nylon, nonwoven nylon, conventional papers, conventional foils, and the like.

In another aspect, the decorative layer of the decorative portion can comprise a three-layer film, for example and without limitation, a SynDECOR® OPP Film manufactured by Applied Extrusion Technologies, Inc. In this aspect, the three-layer film can comprise a top skin, a central core, and a bottom skin. In one aspect, the top skin can be configured to be compatible with the ink layer of the decorative portion of the floor covering. It is contemplated that at least a portion of the ink layer can be applied thereon the top skin of the three-layer film. In another aspect, the central core of the three-layer film can comprise a solid material. In this aspect, the solid material can be substantially opaque. In this aspect, an opaque film can be used. Such an exemplary opaque film is desirable because it can create a color barrier between the decorative layer and the subsequent backing layers that may vary in color. In a further aspect, the bottom skin of the three-layer film can be configured to be compatible with the post-industrial carpet and/or post-consumer carpet materials forming portions of the one or more primary backing layers.

In an additional aspect, the at least one backing layer of the backing portion can comprise one or more primary backing layers and a secondary backing layer. In this aspect, the secondary backing layer can define the bottom surface of the backing portion, and the one or more primary backing layers can be configured to substantially overlie the secondary backing layer. In another aspect, the one or more primary backing layers can comprise, for example and without limitation, low-density polyethylene (LDPE), linear low-density polyethylene (LLDPE), EMA, EVA, PE-PP rubber, conventional thermoplastic elastomers (TPEs), conventional thermoplastic olefins (TPOs), alpha-olefin polyethylene co-polymers, PET, ethylene butyl acrylate (EBA), and the like. In a further aspect, the secondary backing layer can comprise, for example and without limitation, OPP, woven PE, nonwoven PE, woven PP, nonwoven PP, woven PET, nonwoven PET, woven nylon, nonwoven nylon, and the like.

In one aspect, the one or more primary backing layers can comprise a first primary backing layer and a second primary backing layer. In this aspect, the first primary backing layer can define the top surface of the backing portion. Optionally, in another aspect, the backing portion can comprise a fiberglass layer positioned therebetween the first and second primary backing layers.

In one aspect, the one or more primary backing layers can comprise composites of post-industrial carpet and/or composites of post-consumer carpet. In this aspect, a primary backing layer of the one or more primary backing layers can define the upper surface of the backing portion of the floor covering.

In yet another aspect and as disclosed in U.S. patent application Ser. No. 11/963,263, which is incorporated in its entirety by reference herein, at one of the backing layers can be formed from substantially linear ethylene polymers and homogeneously branched linear ethylene polymers (i.e., homogeneously branched ethylene polymers), which offer low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE). Exemplary backing layers formed from the disclosed homogeneously branched ethylene polymers are shown in the figures as EcoWorx.

The use of substantially linear ethylene polymers as a backing layer in the floor covering can allow the elimination of secondary backing materials and as such can result in significant manufacturing cost savings. In addition, floor covering having a substantially linear ethylene polymer or homogeneously branched linear ethylene polymer layer can provide a substantial fluid and particle barrier which enhances the hygienic properties of the floor covering.

The preferred homogeneously branched ethylene polymer has a single melting peak between −30° C. and 150. C, as determined using differential scanning calorimetry. The most preferred homogeneously branched ethylene polymer is a substantially linear ethylene polymer characterized as having:

(a) a melt flow ratio, $I_{10}/I_2 > 5.63$;

(b) a molecular weight distribution, $M_w/M_n$, as determined by gel permeation chromatography and defined by the equation:

$$(M_w/M_n) \le (I_{10}/I_2) - 4.63;$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ .α-olefin and have the same $I_2$ and $M_w/M_n$ and wherein the respective critical shear rates of the substantially linear ethylene polymer and the linear ethylene polymer are measured at the same melt temperature using a gas extrusion rheometer; and

(d) a single differential scanning calorimetry, DSC, melting peak between −30° and 150°.

The homogeneously branched ethylene polymers used in the present invention are characterized by a single DSC melting peak. The single melting peak is determined using a differential scanning calorimeter standardized with indium and deionized water. The method involves 5-7 mg sample sizes, a "first heat" to about 140° C. which is held for 4 minutes, a cool down at $10^2$/min. to −30° C. which is held for 3 minutes, and heat up at 10° C./min. to 150° C. for the "second heat". The single melting peak is taken from the "second heat" heat flow vs. temperature curve. Total heat of fusion of the polymer is calculated from the area under the curve.

For polymers having a density of 0.860 g/cc to 0.910 g/cc, the single melting peak may show, depending on equipment sensitivity, a "shoulder" or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

The molecular weight distribution ($M_w/M_n$) for the substantially linear ethylene polymers and homogeneous linear ethylene polymers used in the present invention is generally from about 1.8 to about 2.8. It is also contemplated that, unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

Suitable homogeneously branched ethylene polymers for use in the present invention include interpolymers of ethylene and at least one α-olefin prepared by a solution, gas phase or slurry polymerization process or combinations thereof. Suitable α-olefins are represented by the following formula:

$$CH_2=CHR$$

where R is a hydrocarbyl radical. Further, R may be a hydrocarbyl radical having from one to twenty carbon atoms and as such the formula includes $C_3$-$C_{20}$ α-olefins. Suitable α-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoro-ethylene, vinyl benzocyclobutene, 1,4-hexadiene, 1,7-octadiene, and cycloalkenes, e.g., cyclopentene, cyclohexene and cyclooctene. Preferably, the comonomer will be 1-butene, 1-pentene, 4-methyl-1-pentene, 1-hexene, 1-heptene, 1-octene, or mixtures thereof, as adhesive backing materials comprised of higher .α-olefins will have especially improved toughness. However, most preferably, the comonomer will be 1-octene and the ethylene polymer will be prepared in a solution process.

In another aspect, it is contemplated that the density of the substantially linear ethylene polymer or homogeneously branched linear ethylene polymer, as measured in accordance with ASTM D-792, will not exceed 0.92 g/cc, and is generally in the range from about 0.85 g/cc to about 0.92 g/cc, preferably from about 0.86 g/cc to about 0.91 g/cc, and especially from about 0.86 g/cc to about 0.90 g/cc.

In a further aspect, the molecular weight of the homogeneously branched linear ethylene polymer or substantially linear ethylene polymer is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. In various aspects, the melt index for the homogeneously branched linear ethylene polymer or substantially linear ethylene polymer is generally from about 1 grams/10 minutes (g/10 min) to about 500 g/10 min, preferably about 2 g/10 min. to about 300 g/10 min., more preferably from about 5 g/10 min to about 100 g/10 min., especially from about 10 g/10 min. to about 50 g/10 min., and most especially about 25 to about 35 g/10 min.

Another measurement useful in characterizing the molecular weight of the homogeneous linear ethylene polymer or the substantially linear ethylene polymer is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene polymer, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene polymer is at least 6.5, preferably at least 7, especially at least 8. The $I_{10}/I_2$ ratio of the homogeneously branched linear ethylene polymer is generally less than 6.3.

Preferred ethylene polymers for us in the present invention have a relative low modulus. That is, the ethylene polymer is characterized as having a 2% secant modulus less than 24,000 psi (163.3 MPa), especially less than 19,000 psi (129.3 MPa) and most especially less than 14,000 psi (95.2 MPa), as measured in accordance with ASTM D790.

Preferred ethylene polymers for use in the a present invention are substantially amorphous or totally amorphous. That is, the ethylene polymer is characterized as having a percent crystallinity less than 40 percent, preferably less than 30 percent, more preferably less than 20 and most preferably less than 10 percent, as measured by differential scanning calorimetry using the equation percent crystallinity=$H_f/292*100$, where $H_f$ is the heat of fusion in Joules/gram.

The homogeneously branched ethylene polymer can be used alone or can be blended or mixed with one or more synthetic or natural polymeric material. Suitable polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

Methods of making the resilient floor coverings described herein are also disclosed. In one aspect, a method of making the resilient floor coverings described herein can comprise providing the backing portion as described herein. Optionally, in another aspect, the method of making the resilient floor coverings described herein can comprise applying the decorative portion thereto the top surface of the backing portion. In an alternative aspect, the method of making the resilient floor coverings described herein can comprise applying a tie layer as described herein thereto the top surface of the backing portion. In this aspect, the method of making the resilient floor coverings described herein can comprise applying the decorative portion thereto the tie layer applied to the backing portion. It is contemplated that the bottom surface of the decorative portion can be substantially directly applied to the top surface of the backing portion or the tie layer applied thereto the backing portion. It is also contemplated that the bottom surface of the decorative portion can be applied to the top surface of the backing portion, or the tie layer applied thereto the backing portion, using a chemical adhesive, mechanical connection, or other application means.

Optionally, in an additional aspect, the method of making the resilient floor coverings described herein can comprise applying the wear layer thereto the top surface of the decorative portion. In an alternative aspect, the method of making the resilient floor coverings described herein can comprise applying one or more tie layers as described herein thereto the top surface of the decorative portion. In this aspect, the method of making the resilient floor coverings described herein can comprise applying the wear layer thereto the tie layer applied to the decorative portion. It is contemplated that the wear layer can be substantially directly applied to the top surface of the decorative portion or the tie layer applied thereto the decorative portion. It is also contemplated that the wear layer can be applied to the top surface of the decorative portion, or the tie layer applied thereto the decorative portion, using a chemical adhesive, mechanical connection, or other application means.

It is contemplated that the exemplified layers can be constructed or otherwise formed by conventional methods and/or processes. Similarly, it is contemplated that the respective layers can be connected to each other in sequential or non-sequential order. Unless otherwise stated, no particular order of operative steps for product formation is required to practice the present invention. It is further contemplated that any conventional means of forming or joining layers of a layered construct such as the exemplified resilient floor covering can be used, to include, without limitation, extrusion, lamination, combinations of the same, and the like. Finally, it is contemplated that after the layers of the flooring covering are joined together, the resulting sheet of flooring composite can be cut into desired shapes and desired sizes, for example, and without limitation, into plank or tile shapes that can be conventionally or non-conventionally sized and/or shaped.

As disclosed herein, in one aspect the materials that are selected for the respective layers of the flooring covering can be readily recycled. It is contemplated that one or more of the respective layers of the can comprise recycled post-consumer and/or post-industrial materials, such as, for example and without limitation, recycled post-industrial carpet and/or post-consumer carpet polymeric materials. In this aspect, the formed floor covering can minimize use of virgin materials and advantageously allow for the use of previously recycled materials in forming the recyclable flooring covering of the present invention.

Figure 2:
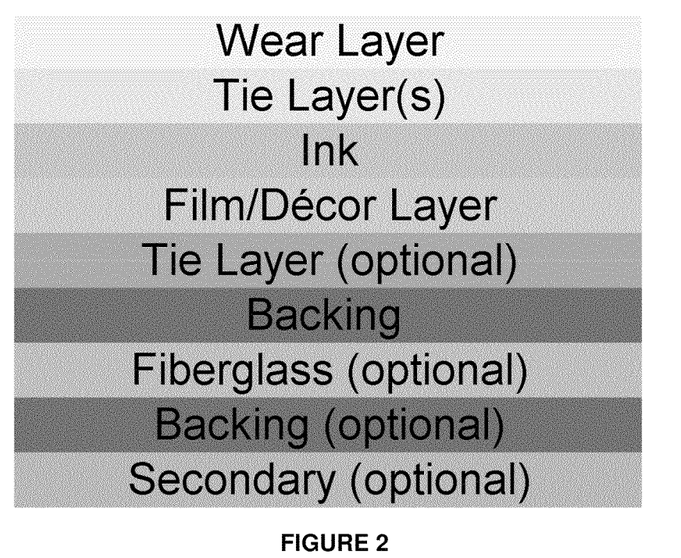
Figure 3:
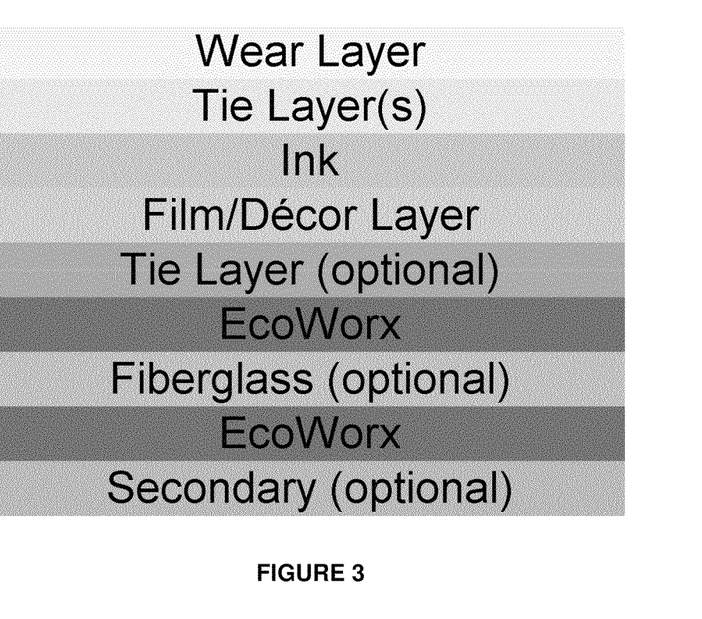
Figure 4:
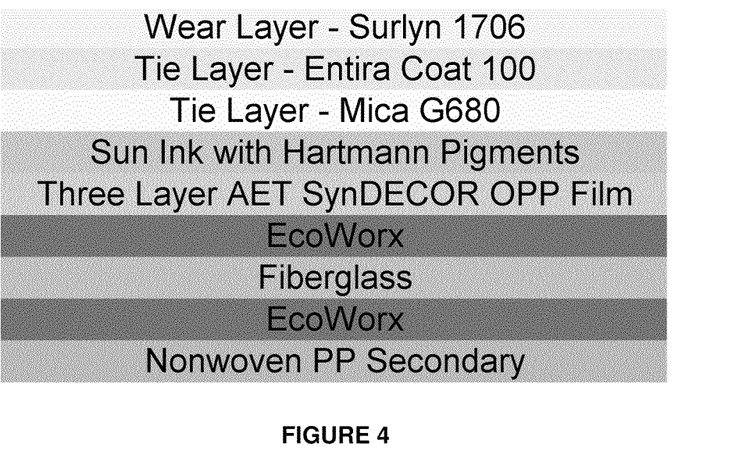

Referring to FIGS. 2-4, one exemplified method of constructing the resilient floor covering can initially comprise the step of adhering one or more layers of ink onto the top surface of the film/décor layer using conventional print means. Next, a tie layer can subsequently be applied to the top surface of the ink layers if desired or if the materials that form the respective ink layers and wear layer require the use of a tie layer. Optionally, the tie layer can be extruded onto or laminated thereto the top surface of the ink layer. In the example shown in FIG. 4, the film/décor layer comprises the three layer AET SynDECOR® OPP film and the ink layer comprises Sun Ink with Hartmann Pigments. For this particular example, two successive tie layers are applied, Mica G680, which is connected to the top surface of the ink layer, and Entira™ Coat 100, which is applied to the top surface of the Mica G680 tie layer.

Subsequently, a first layer of primary backing is extruded thereon or otherwise connected to the bottom surface of the film/décor layer and a fiberglass mat layer is imbedded therein the bottom surface of the first layer of backing. Of course, prior to this step, an optionally tie layer can be connected to the bottom surface of the film/décor layer if required.

Next, a wear layer is extruded or otherwise connected to either the top surface of the ink layer or the top surface of the topmost tie layer. It is contemplated that, if needed, the application of the tie layer to the top surface of the ink layer and the application of the wear layer to the uppermost tie layer can be done sequentially in a co-extrusion process. For example, in FIG. 4, the Entira™ Coat 100 tie layer and the Surlyn® 1706 wear layer can be sequentially applied to the top surface of the underlying Mica G680 tie layer.

In the next exemplary sequential step, a second layer of primary backing is extruded thereon or otherwise connected to the bottom surface of the fiberglass mat layer to fully encapsulate the fiberglass layer. Referring to FIGS. 3 and 4, in one example, the respective first and second layers of primary backing can comprise the EcoWorx material described herein. Next, if desired, a secondary backing, such as the exemplified non-woven PP secondary, can be extruded thereon or otherwise connected to the bottom surface of the second layer of primary backing.

Of course, as noted in FIGS. 2 and 3, a optional tie layer could be applied to the bottom surface of the film/décor layer if desired or if the materials forming the film/décor layer and the first layer of primary backing were otherwise incapable of operatively bonding to each other. As noted in FIG. 4, no tie layer was required to effect a desired bond between the three layer AET SynDECOR® OPP film (the film/décor layer) and the EcoWorx material (the first layer of primary backing).

Figure 5:
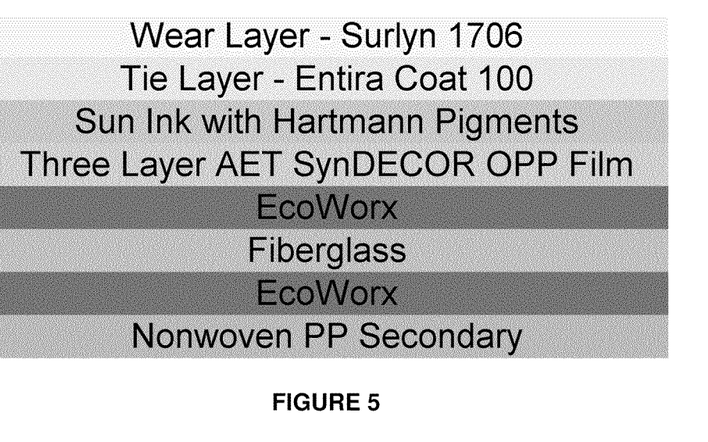

In another example and referring now to the particular example illustrated in FIG. 5, initially the Sun Ink with Hartmann Pigments layer is applied to the top surface of the three layer AET SynDECOR® OPP film. Sequentially, the first primary backing layer of EcoWorx is applied to the bottom surface of three layer AET SynDECOR® OPP film and the fiberglass material is applied to the bottom surface of the first primary backing layer of EcoWorx. Next, sequentially, the Entira™ Coat 100 tie layer is applied to the Sun Ink layer and the Surlyn® 1706 wear layer is applied to the top surface of the Entira™ Coat 100 tie layer. Finally, sequentially, the second primary backing layer of EcoWorx is applied to the fiberglass material layer thus adhering the non-woven PP secondary backing layer to the bottom surface of the fiberglass material layer.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A resilient floor covering, comprising:
   a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a first primary backing layer, a second primary backing layer, and a secondary backing layer;
   a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and
   a wear layer having an exposed outer surface configured for exposure to the ambient environment and an opposed bottom surface configured to substantially overlie the decorative portion of the floor covering,
   wherein the resilient floor covering does not comprise vinyl polymer material.

2. The resilient floor covering of claim 1, wherein the secondary backing layer of the at least one backing layer defines the bottom surface of the backing portion and wherein the first primary backing layer of the at least one backing layer defines the top surface of the backing portion.

3. The resilient floor covering of claim 1, wherein the first and second primary backing layers comprise at least one of: low-density polyethylene (LDPE), linear low-density polyethylene (LLDPE), EMA, EVA, PE-PP rubber, conventional thermoplastic elastomers (TPEs), conventional thermoplastic olefins (TPOs), alpha-olefin polyethylene co-polymers, PET, or ethylene butyl acrylate (EBA).

4. The resilient floor covering of claim 1, wherein first and second primary backing layers are configured to substantially overlie the secondary backing layer.

5. The resilient floor covering of claim 4, wherein the secondary backing layers comprises at least one of: OPP, woven PE, nonwoven PE, woven PP, nonwoven PP, woven PET, nonwoven PET, woven nylon, or nonwoven nylon.

6. The resilient floor covering of claim 1, wherein the backing portion further comprises a fiberglass layer positioned therebetween the first and second primary backing layers.

7. The resilient floor covering of claim 1, wherein at least one of the backing layers comprises substantially linear ethylene polymers and homogeneously branched linear ethylene polymers.

8. The resilient floor covering of claim 7, wherein at least one of the backing layers further comprises: another homogeneously branched ethylene polymer, low density polyethylene, heterogeneously branched LLDPE, heterogeneously branched ULDPE, medium density polyethylene, high density polyethylene, grafted polyethylene, ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, or vulcanates.

9. The resilient floor covering of claim 1, wherein the ink layer defines the top surface of the decorative portion.

10. The resilient floor covering of claim 1, wherein the ink layer defines the bottom surface of the decorative portion.

11. The resilient floor covering of claim 1, wherein the ink layer comprises at least one ink selected from a group consisting of: water based, soy-based, or solvent-based pigments.

12. The resilient floor covering of claim 1, wherein the wear layer is positioned adjacent to the decorative portion such that the top surface of the decorative portion contacts the bottom surface of the wear layer.

13. The resilient floor covering of claim 12, wherein the wear layer comprises at least one of: polyethylene terephthalate (PET), polyurethane, polypropylene, polytrimethylene terephthalate (PTT), Nylon 6, or Nylon 6,6.

14. The resilient floor covering of claim 1, further comprising at least one tie layer, wherein the at least one tie layer is configured to be positioned between opposing layers of the resilient floor covering to bond otherwise dissimilar materials that form the otherwise opposing layers of the floor covering together.

15. The resilient floor covering of claim 14, wherein one or more tie layers of the at least one tie layer are positioned therebetween the bottom surface of the wear layer and the top surface of the decorative portion of the floor covering.

16. The resilient floor covering of claim 14, wherein one or more tie layers of the at least one tie layer are positioned therebetween the bottom surface of the decorative portion and the top surface of the backing portion.

17. The resilient floor covering of claim 14, wherein the tie layer comprises at least one of water borne extrusion coating primers, polyethyleneimine (PEI), conventional acrylic materials, maleic anhydride (MAH), ethylene-methyl acrylate (EMA), or ethylene-vinyl acetate (EVA).

18. The resilient floor covering of claim 1, wherein the decorative portion comprises a decorative layer.

19. The resilient floor covering of claim 18, wherein the decorative layer defines the bottom surface of the decorative portion of the floor covering, and wherein the ink layer is configured to substantially overlie the decorative layer.

20. The resilient floor covering of claim 18, wherein the decorative layer comprises at least one of: oriented polypropylene (OPP), woven polyethylene (PE), nonwoven PE, woven polypropylene (PP), nonwoven PP, woven PET, nonwoven PET, woven nylon, nonwoven nylon, conventional papers, conventional foils.

21. The resilient floor covering of claim 1, wherein the first and second primary backing layers comprise composites of post-industrial carpet or composites of post-consumer carpet.

22. The resilient floor covering of claim 19, wherein the decorative layer comprises a film.

23. The resilient floor covering of claim 22, wherein the film is a three-layer film comprising a top skin, a central core, and a bottom skin, wherein the ink layer overlies the top skin of the three-layer film, wherein the central core is positioned between the top skin and the bottom skin, and wherein the bottom skin of the three-layer film defines the bottom surface of the decorative portion of the floor covering.

24. The resilient floor covering of claim 23, wherein the top skin of the three-layer film is compatible with the material of the ink layer, wherein the bottom skin of the three-layer film is compatible with the material of the first backing layer, and wherein the central core of the three-layer film comprises a substantially opaque material.

* * * * *